(12) United States Patent
Veerasamy et al.

(10) Patent No.: US 7,537,801 B2
(45) Date of Patent: May 26, 2009

(54) HEAT TREATABLE COATED ARTICLE WITH DIAMOND-LIKE CARBON (DLC) AND/OR ZIRCONIUM IN COATING

(75) Inventors: Vijayen S. Veerasamy, Ann Arbor, MI (US); Fabio Reis de Almeida, Ennis, TX (US); Michael Wiegner, Oak Leaf, TX (US)

(73) Assignee: Guardian Industries Corp., Auburn Hills, MI (US)

( * ) Notice: Subject to any disclaimer, the term of this patent is extended or adjusted under 35 U.S.C. 154(b) by 759 days.

(21) Appl. No.: 11/165,535

(22) Filed: Jun. 24, 2005

(65) Prior Publication Data

US 2006/0057294 A1  Mar. 16, 2006

Related U.S. Application Data

(63) Continuation-in-part of application No. 10/994,207, filed on Nov. 22, 2004, now Pat. No. 7,507,442, and a continuation-in-part of application No. 10/785,707, filed on Feb. 25, 2004, now Pat. No. 7,150,849, and a continuation-in-part of application No. 10/700,359, filed on Nov. 4, 2003, now Pat. No. 7,501,148.

(51) Int. Cl.
  *B05D 3/02* (2006.01)
  *B05D 3/00* (2006.01)
(52) U.S. Cl. ............ 427/165; 427/166; 427/372.2; 427/383.5; 427/255.31
(58) Field of Classification Search ........ 427/249.7, 427/372.2, 255.31, 248.1
See application file for complete search history.

(56) References Cited

U.S. PATENT DOCUMENTS

| | | | | |
|---|---|---|---|---|
| 2,461,019 A | * | 2/1949 | Alexander | 423/411 |
| 5,059,295 A | * | 10/1991 | Finley | 204/192.27 |
| 5,135,808 A | * | 8/1992 | Kimock et al. | 428/336 |
| 5,190,807 A | | 3/1993 | Kimock et al. | |
| 5,242,560 A | | 9/1993 | Lingle et al. | |
| 5,279,808 A | * | 1/1994 | Xiao et al. | 423/411 |
| 5,508,092 A | | 4/1996 | Kimock et al. | |
| 5,527,596 A | | 6/1996 | Kimock et al. | |

(Continued)

FOREIGN PATENT DOCUMENTS

EP  1 380 553  1/2004

(Continued)

OTHER PUBLICATIONS

Milosev et al. Comparison of TiN, ZrN and CrN hard nitride coating: Electrochemical and thermal oxidation. 1997. Thin Film Solids 303, pp. 246-254.*

(Continued)

*Primary Examiner*—Timothy H Meeks
*Assistant Examiner*—David Turocy
(74) *Attorney, Agent, or Firm*—Nixon & Vanderhye P.C.

(57) ABSTRACT

In certain example embodiments, a coated article includes a zirconium nitride inclusive layer before heat treatment (HT). The coated article is heat treated sufficiently to cause the zirconium nitride based layer to transform into a zirconium oxide based layer that is scratch resistant and/or durable. In certain example embodiments, the zirconium nitride and/or zirconium oxide may be doped with F and/or C.

19 Claims, 7 Drawing Sheets

U.S. PATENT DOCUMENTS

| | | | |
|---|---|---|---|
| 5,635,245 | A | 6/1997 | Kimock et al. |
| 5,679,413 | A | 10/1997 | Petrmichl et al. |
| 6,261,693 | B1 | 7/2001 | Veerasamy |
| 6,303,226 | B2 | 10/2001 | Veerasamy |
| 6,338,901 | B1 | 1/2002 | Veerasamy |
| 6,376,888 | B1 * | 4/2002 | Tsunashima et al. ........ 257/407 |
| 6,395,333 | B2 | 5/2002 | Veerasamy |
| 6,416,816 | B2 | 7/2002 | Veerasamy et al. |
| 6,447,891 | B1 | 9/2002 | Veerasamy et al. |
| 6,475,573 | B1 | 11/2002 | Veerasamy et al. |
| 6,495,251 | B1 | 12/2002 | Marietti et al. |
| 6,682,773 | B2 | 1/2004 | Medwick et al. |
| 6,740,211 | B2 | 5/2004 | Thomsen et al. |
| 6,764,579 | B2 | 7/2004 | Veerasamy et al. |
| 6,770,321 | B2 | 8/2004 | Hukari et al. |
| 6,777,030 | B2 | 8/2004 | Veerasamy et al. |
| 6,783,253 | B2 | 8/2004 | Thomsen et al. |
| 6,793,979 | B2 | 9/2004 | Veerasamy |
| 6,849,328 | B1 | 2/2005 | Medwick et al. |
| 6,902,813 | B2 | 6/2005 | O'Shaughnessy et al. |
| 6,921,579 | B2 | 7/2005 | O'Shaughnessy et al. |
| 7,150,849 | B2 * | 12/2006 | Veerasamy .................. 264/603 |
| 2002/0045073 | A1 * | 4/2002 | Finley ........................ 428/701 |
| 2002/0192473 | A1 | 12/2002 | Gentilhomme et al. |
| 2003/0155065 | A1 | 8/2003 | Thomsen et al. |
| 2003/0170464 | A1 | 9/2003 | Veerasamy |
| 2005/0095430 | A1 | 5/2005 | Veerasamy |
| 2005/0095431 | A1 | 5/2005 | Veerasamy |
| 2006/0057294 | A1 | 3/2006 | Veerasamy et al. |

FOREIGN PATENT DOCUMENTS

| | | |
|---|---|---|
| WO | WO 03/068502 | 8/2003 |
| WO | WO 2004/007387 | 1/2004 |
| WO | WO 2005/021454 | 3/2005 |
| WO | WO 2005/021456 | 3/2005 |
| WO | WO 2006/057846 | 6/2006 |

OTHER PUBLICATIONS

U.S. Appl. No. 10/994,207, filed Nov. 22, 2004.
U.S. Appl. No. 10/785,707, filed Feb. 25, 2004.
U.S. Appl. No. 10/700,359, filed Nov. 4, 2003.
International Search Report dated Jan. 21, 2005.
U.S. Appl. No. 11/586,692, filed Oct. 26, 2006.
U.S. Appl. No. 11/586,693, filed Oct. 26, 2006.

* cited by examiner

HEAT TREATABLE COATED ARTICLE WITH DIAMOND-LIKE CARBON (DLC) AND/OR ZIRCONIUM IN COATING

This application is a continuation-in-part (CIP) of U.S. patent application Ser. No. 10/994,207, filed Nov. 22, 2004 now U.S. Pat. No. 7,507,442, and a CIP of Ser. No. 10/785,707, filed Feb. 25, 2004, now U.S. Pat. No. 7,150,849,and also a CIP of 10/700,359, filed Nov. 4, 2003 now U.S. Pat. No. 7,501,148, the entire disclosures of which are all hereby incorporated herein by reference.

This invention relates to a method of making a coated article to be used in a window unit or any other suitable application such as furniture glass or picture frame glass. For example, certain embodiments of this invention relate to a method of making a window unit (e.g., vehicle window such as vehicle windshield, backlite, sunroof, or sidelite, or IG window unit, or shower door window) including a step of heat treating a glass substrate coated with at least a layer comprising zirconium nitride and/or diamond-like carbon (DLC). In certain example embodiments, the glass substrate may be coated with only a layer of or including zirconium nitride, and the be heat treated where the zirconium nitride inclusive layer transforms into a layer comprising zirconium oxide due to the heat treatment.

Optionally, DLC may be provided over the zirconium nitride prior to heat treatment. DLC may be used to generate energy during heat treatment (HT) for transforming at least another layer in the coating so as to form a new post-HT layer(s) which was not present before the heat treatment.

Certain other example embodiments of this invention relate to such a coated article, heat treated or not, which may be used in window applications, or any other suitable application such as furniture glass or the like.

BACKGROUND OF THE INVENTION

Vehicle windows (e.g., windshields, backlites, sunroofs, and sidelites) are known in the art. For purposes of example, vehicle windshields typically include a pair of bent glass substrates laminated together via a polymer interlayer such as polyvinyl butyral (PVB). It is known that one of the two glass substrates may have a coating (e.g., low-E coating) thereon for solar control purposes such as reflecting IR and/or UV radiation, so that the vehicle interior can be more comfortable in certain weather conditions. Conventional vehicle windshields are made as follows. First and second flat glass substrates are provided, one of them optionally having a low-E coating sputtered thereon. The pair of glass substrates are washed and booked together (i.e., stacked on one another), and then while booked are heat bent together into the desired windshield shape at a high temperature(s) (e.g., 8 minutes at about 600-625 degrees C.). The two bent glass substrates are then laminated together via the polymer interlayer to form the vehicle windshield.

Insulating glass (IG) window units are also known in the art. Conventional IG window units include at least first and second glass substrates (one of which may have a solar control coating on an interior surface thereof) that are coupled to one another via at least one seal(s) or spacer(s). The resulting space or gap between the glass substrates may or may not be filled with gas and/or evacuated to a low pressure in different instances. However, many IG units are required to be tempered. Thermal tempering of the glass substrates for such IG units typically requires heating the glass substrates to temperature(s) of at least about 600 degrees C. for a sufficient period of time to enable thermal tempering.

Other types of coated articles also require heat treatment (HT) (e.g., tempering, heat bending, and/or heat strengthening) in certain applications. For example and without limitation, glass shower doors, glass table tops, and the like require HT in certain instances.

Diamond-like carbon (DLC) is sometimes known for its scratch resistant properties. For example, different types of DLC are discussed in the following U.S. Pat. Nos. 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and 5,470,661, all of which are hereby incorporated herein by reference.

It would sometimes be desirable to provide a window unit or other glass article with a protective coating including DLC in order to protect it from scratches and the like. Unfortunately, DLC tends to oxidize and burn off at temperatures of from approximately 380 to 400 degrees C. or higher, as the heat treatment is typically conducted in an atmosphere including oxygen. Thus, it will be appreciated that DLC as a protective overcoat cannot withstand heat treatments (HT) at the extremely high temperatures described above which are often required in the manufacture of vehicle windows, IG window units, glass table tops, and/or the like. Accordingly, DLC cannot be used alone as a coating to be heat treated, because it will oxidize during the heat treatment and substantially disappear as a result of the same (i.e., it will burn off).

Certain other types of scratch resistant materials also are not capable of withstanding heat treatment sufficient for tempering, heat strengthening and/or bending of an underlying glass substrate.

Accordingly, those skilled in the art will appreciate that a need in the art exists for a method of making a scratch resistant coated article that is capable of being heat treated (HT) so that after heat treatment the coated article is still scratch resistant. A need for corresponding coated articles, both heat treated and pre-HT, also exists.

BRIEF SUMMARY OF EXAMPLES OF INVENTION

In certain example embodiments of this invention, there is provided a method of making a coated article (e.g., window unit such as for a vehicle, building, or the like) that is capable of being heat treated so that after being heat treated (HT) the coated article is scratch resistant to an extent more than uncoated glass.

In certain example embodiments of this invention, prior to heat treatment a coated article includes a layer of or including zirconium nitride on a glass substrate. This may be the only layer on the glass substrate in certain example embodiments, or alternatively other layers may be present. Heat treatment (e.g., thermal tempering) of the coated article causes the zirconium nitride inclusive layer to transform either partially or entirely into a layer of or including zirconium oxide that can be used for scratch resistant purposes.

In certain example instances, that are not limiting, the zirconium oxide inclusive layer following heat treatment may be buffed or surface treated in order to improve scratch resistance thereof. Moreover, the zirconium nitride inclusive layer, and thus the zirconium nitride inclusive layer, may be doped with other materials such as F in certain example non-limiting instances.

In certain example embodiments, an optional layer of diamond-like carbon (DLC) may be provided on the glass substrate over at least the zirconium nitride inclusive layer prior to heat treatment. In certain example embodiments, the DLC may be hydrogenated. The DLC may be located below and/or over the layer comprising zirconium nitride in certain example instances. During HT, the hydrogenated DLC may act as a fuel which upon combustion with oxygen produces carbon dioxide and/or water. This exothermic reaction, caused by combustion of hydrogenated carbon of the DLC, causes spontaneous propagation of a combustion wave through the initial reactants. The high temperature developed during this combustion may heat the layer comprising zirconium nitride to a temperature(s) well above the heat treating temperature, thereby causing the layer comprising zirconium nitride to be transformed into a new post-HT layer comprising zirconium oxide. The new post-HT layer comprising zirconium oxide may also include nitrogen in certain example embodiments of this invention.

In certain example embodiments, at least prior to heat treatment, the layer(s) comprising zirconium nitride may be doped with fluorine (F) and/or carbon (C). Surprisingly, it has been found that this tends to increase the visible transmission of the heat treated coated article.

The new post-HT layer comprising zirconium oxide is surprisingly scratch resistant. Thus, it can be seen that a technique has been provided which allows for a heat treatable scratch resistant product; and the coated article may also have good transmission properties. In certain example embodiments, the scratch resistance of the post-HT coated article may even be better than that of non-HT DLC.

In certain example embodiments, there is provided a method of making a heat treated coated article, the method comprising: providing a coating supported by a glass substrate, the coating comprising a zirconium nitride based layer; and thermally tempering the glass substrate with the zirconium nitride based layer thereon, so that the tempering causes the zirconium nitride based layer to transform into a layer comprising zirconium oxide ($Zr_xO_y$) where y/x is from about 1.2 to 2.5. A layer(s) comprising diamond-like carbon may optionally be provide over and/or under the layer comprising zirconium nitride in certain example embodiments.

DETAILED DESCRIPTION OF EXAMPLE EMBODIMENTS OF THE INVENTION

Figure 1:
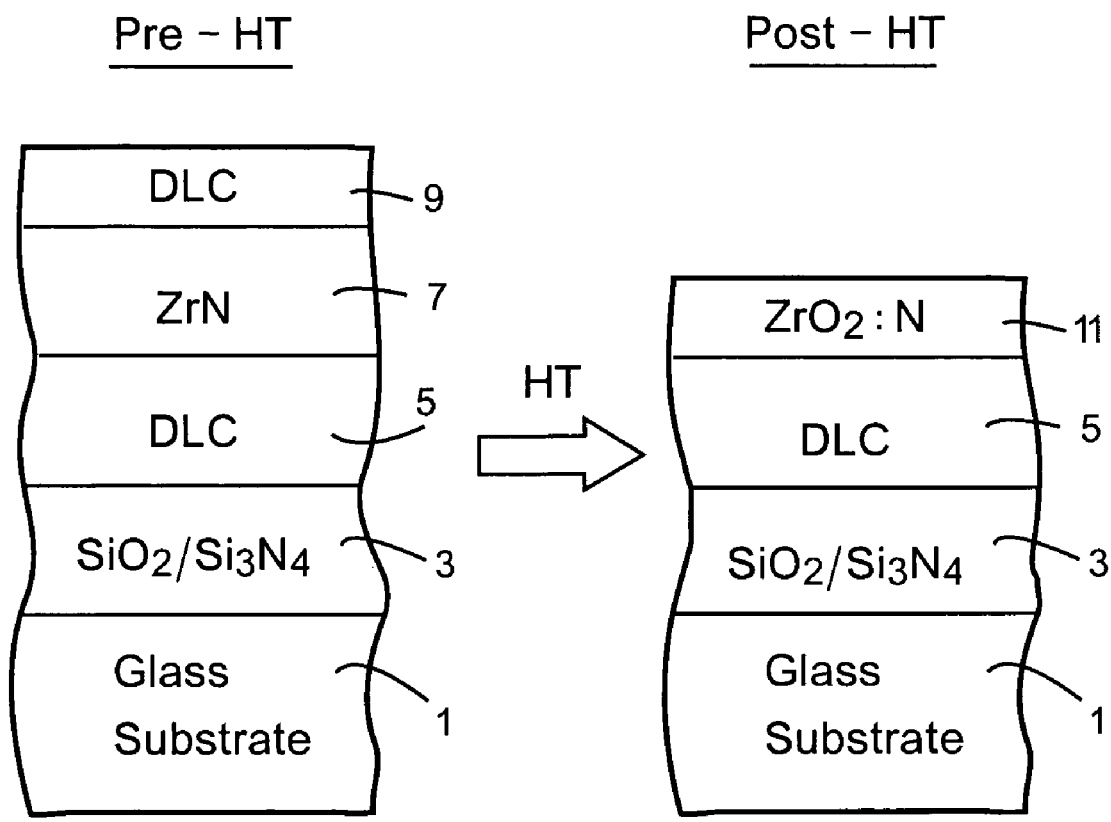
FIG. 1 is a schematic diagram illustrating coated articles according to an embodiment of this invention before and after heat treatment.

Referring now more particularly to the accompanying drawings in which like reference numerals indicate like parts or layers throughout the several views.

In certain example embodiments of this invention, prior to heat treatment (HT) a coated article includes a layer of or including zirconium nitride on a glass substrate. This may be the only layer on the glass substrate in certain example embodiments, or alternatively other layers may be present. Heat treatment (e.g., thermal tempering) of the coated article causes the zirconium nitride inclusive layer to transform either partially or entirely into a layer of or including zirconium oxide that can be used for scratch resistant purposes.

Certain example embodiments of this invention relate to methods of making coated articles that may use heat treatment (HT), wherein the coated article includes a coating (one or more layers) including diamond-like carbon (DLC) and/or zirconium. In certain instances, the HT may involve heating a supporting glass substrate, with the DLC and/or zirconium inclusive layer(s) thereon, to temperature(s) of from 550 to 800 degrees C., more preferably from 580 to 800 degrees C. (which is well above the burn-off temperature of DLC). In particular, certain example embodiments of this invention relate to a technique for allowing the post-HT coated article to be more scratch resistant than uncoated glass.

In certain example embodiments, the coated article as originally formed (i.e., prior to HT, or pre-HT) includes respective alternating layers comprising hydrogenated diamond-like carbon (DLC) and zirconium nitride, or possibly the coated article prior to HT may include only a layer of or including zirconium nitride (which may be doped with other material(s) as discussed herein). DLC may be located below and/or above the zirconium nitride. During HT (e.g., using temperature(s) of from 550 to 800 degrees C., more preferably from 580 to 800 degrees C.), the hydrogenated DLC acts as a fuel which upon combustion with oxygen from the atmosphere produces carbon dioxide and water. This exothermic reaction, caused by combustion of the hydrogenated carbon of the DLC, causes spontaneous propagation of a combustion wave through the initial reactants. The high temperature developed during this DLC combustion heats the layer(s) comprising zirconium nitride to a temperature(s) well above the heat treating temperature used. For example, the combustion of the DLC may heat part of all of the layer(s) comprising zirconium nitride to a temperature of at least about 1200 degrees C., more preferably at least about 1500 degrees C., and most preferably at least about 2,000 degrees C. In embodiments where the DLC is not present prior to HT, the heat of the furnace during HT causes the zirconium nitride to transform into zirconium oxide during the HT.

Because the layer(s) comprising zirconium nitride is heated to such a high temperature due to the HT and/or DLC combustion during HT, at least the layer(s) comprising zirconium nitride is transformed due to the high temperature(s) into a new post-HT layer(s) comprising zirconium oxide. The new post-HT layer(s) comprising zirconium oxide may also include nitrogen in certain example embodiments of this invention (e.g., $ZrO:N$; $ZrO_2:N$, $ZrO_x:N$ (where x is from 1 to 3, more preferably from 1.5 to 2.5), and/or any other suitable stoichiometry). The new post-HT layer(s) comprising zirconium oxide (optionally with nitrogen) is surprisingly scratch resistant. Thus, it can be seen that a technique has been provided which allows for a heat treatable scratch resistant product to be made; and the coated article may also have good transmission properties. In certain example embodiments, the scratch resistance of the post-HT coated article may even be better than that of non-HT DLC.

In certain example embodiments of this invention, the post-HT layer(s) comprising zirconium oxide includes a nanocrystalline cubic lattice structure. The entire layer(s) may be of a nanocrystalline cubic lattice structure type, or alternatively only part of the layer(s) may include nanocrystalline cubic lattice structure. Zirconium nitride typically does not grow in cubic phase unless at a temperature of at least about 2,000 degrees C. The ZrN pre-HT is typically not in cubic lattice form. Since the HT is only at a temperature of no greater than about 900 degrees C. (more preferably no greater than about 800 degrees C.), one would expect that the pre-HT non-cubic zirconium nitride would not grow in cubic phase during HT. However, it has surprisingly been found that the HT causes at least part of the layer comprising zirconium nitride to be heated sufficiently to cause it to transform into a post-HT layer(s) comprising zirconium oxide which includes a nanocrystalline cubic lattice structure (with or without nitrogen) which is scratch resistant.

Thus, it can be seen that in certain example embodiments of this invention the pre-HT zirconium nitride inclusive layer is transformed during HT into a new post-HT layer comprising zirconium oxide including a nanocrystalline cubic lattice structure, even though the temperatures used by the furnace during HT may be less than those required for typically allowing the cubic growth.

As a result of the HT, the amount of oxygen in the post-HT zirconium inclusive layer(s) is much higher than the amount of oxygen in the pre-HT zirconium inclusive layer(s). For example, in certain example embodiments of this invention, the post-HT layer(s) comprising zirconium oxide includes at least 5 times as much oxygen as the pre-HT layer(s) comprising zirconium nitride, more preferably at least 10 times as much, and most preferably at least 20 times as much oxygen as the pre-HT layer(s). In certain example embodiments of this invention, the pre-HT layer(s) comprising zirconium nitride includes from about 0-10% oxygen, more preferably from about 0-5% oxygen, and most preferably from about 0-2% (atomic %) oxygen. Meanwhile, in certain example embodiments of this invention, following HT and phase transformation due to DLC combustion, the post-HT layer(s) comprising zirconium oxide includes much more oxygen as will be explained below.

In certain example embodiments, at least prior to heat treatment, one or more of the layers comprising zirconium nitride may be doped with fluorine (F) and/or carbon (C). This may be done, for example, by using a gas such as $C_2F_6$ during sputter-deposition of the layer(s) comprising zirconium nitride. Surprisingly, it has been found that doping the zirconium nitride with F and/or C prior to heat treatment tends to increase the visible transmission of the heat treated coated article. Of course, following heat treatment the layer comprising zirconium oxide may also be doped with F and/or C in a corresponding manner since it was present before HT. This doping of zirconium nitride (and/or zirconium oxide) with F and/or C may be used in conjunction with any embodiment discussed herein.

FIG. 1 is a schematic diagram illustrating how a coated article can be made according to an example embodiment of this invention. Initially, a coated article is formed using a glass substrate 1. The coated article includes, supported by glass substrate 1, at least one optional dielectric layer 3 of or including silicon nitride, silicon oxynitride, silicon oxide, or the like; a first layer of or including DLC 5, a first layer of or including zirconium nitride 7 (e.g., ZrN, or any other suitable stoichiometry), and a top layer of or including DLC 9. Glass substrate 1 is typically of or includes soda-lime-silica glass, although other types of glass may be used in certain instances.

Dielectric layer(s) 3 is provided in order to prevent sodium diffusion into the DLC during HT (i.e., a diffusion barrier). This layer(s) 3 also permits thermal mismatching to occur without problems between the DLC and the glass substrate so as to more easily permit heat bending and the like. Unexpectedly, it has been found that the use of silicon oxide as a barrier layer 3 (compared to silicon nitride) often leads to improved optical results of the final product after heat treatment such as higher visible transmission in certain example embodiments of this invention. Any of the aforesaid barrier layer 3 materials may be doped (e.g., 0.5 to 15%) with Al, stainless steel, or any other metal(s) in certain embodiments of this invention. Barrier layer(s) 3 is formed on the glass substrate 1 via sputtering, or via any other suitable technique.

The layers 5 and 9 comprising DLC may be of any suitable type of DLC, including but not limited to any of the DLC types described in any of U.S. Pat. Nos. 6,592,993; 6,592,992; 6,531,182; 6,461,731; 6,447,891; 6,303,226; 6,303,225; 6,261,693; 6,338,901; 6,312,808; 6,280,834; 6,284,377; 6,335,086; 5,858,477; 5,635,245; 5,888,593; 5,135,808; 5,900,342; and/or 5,470,661, all of which are hereby incorporated herein by reference.

For purposes of example only, DLC inclusive layer(s) 5 and/or 9 may each be from about 5 to 1,000 angstroms (Å) thick in certain example embodiments of this invention, more preferably from 10-300 Å thick, and most preferably from 45 to 65 Å thick. In certain example embodiments of this invention, DLC layer(s) 5 and/or 9 may have an average hardness of at least about 10 GPa, more preferably at least about 20 GPa, and most preferably from about 20-90 GPa. Such hardness renders layers 5 and 9 resistant to scratching, certain solvents, and/or the like. Layer(s) 5 and/or 9 may, in certain example embodiments, be of or include a special type of DLC known as highly tetrahedral amorphous carbon (t-aC), and may be hydrogenated (t-aC:H) in certain embodiments. In certain hydrogenated embodiments, the t-aC:H type of DLC may include from about 4 to 39% hydrogen, more preferably from 5-30% H, and most preferably from 10-20% H.

This t-aC or t-aC:H type of DLC for layer(s) 5 and/or 9 may include more $sp^3$ carbon-carbon (C—C) bonds than $sp^2$ carbon-carbon (C—C) bonds. In certain example embodiments, at least about 50% of the carbon-carbon bonds in DLC layer(s) 5 and/or 9 may be $sp^3$ type carbon-carbon (C—C) bonds, more preferably at least about 60% of the carbon-carbon bonds in the layer(s) may be $sp^3$ carbon-carbon (C—C) bonds, and most preferably at least about 70% of the carbon-carbon bonds in the layer(s) may be $sp^3$ carbon-carbon (C—C) bonds. In certain example embodiments of this invention, the DLC in layer(s) 5 and/or 9 may have an average density of at least about 2.4 $gm/cm^3$, more preferably at least about 2.7 $gm/cm^3$.

Example linear ion beam sources that may be used to deposit DLC inclusive layers 5 and 9 on substrate 1 include any of those in any of U.S. Pat. Nos. 6,261,693, 6,002,208, 6,335,086, or 6,303,225 (all incorporated herein by reference). When using an ion beam source to deposit layer(s) 5 and/or 9, hydrocarbon feedstock gas(es) (e.g., $C_2H_2$), HMDSO, or any other suitable gas, may be used in the ion beam source in order to cause the source to emit an ion beam toward substrate 1 for forming layer(s) 5 and/or 9. It is noted that the hardness and/or density of layer(s) 5 and/or 9 may be adjusted by varying the ion energy of the depositing apparatus. In certain example embodiments, at least about 2,000 V (anode to cathode volts), e.g., about 3,000 V, may be used in the ion source in depositing layer(s) 5 and/or 9. It is noted that the phrase "on the substrate" as used herein is not limited to being in direct contact with the substrate as other layer(s) may still be provided therebetween.

Zirconium nitride inclusive layer 7 is provided between DLC layers 5 and 9 in certain example embodiments of this invention. In certain example embodiments, zirconium nitride inclusive layer 7 may be located directly between DLC layers 5 and 9 so as to contact each of them; however in other example embodiments other layer(s) (not shown) may be provided between the zirconium nitride inclusive layer 7 and the DLC layer(s) 5 and/or 9. The zirconium nitride inclusive layer 7 may consist essentially of zirconium and nitride, or alternatively may include other materials including but not limited to oxygen, or other dopants such as Al, F, C or the like. Zirconium nitride inclusive layer 7 may be formed by sputtering or the like in certain example embodiments of this invention. The pre-HT layer(s) comprising zirconium nitride 7 (and 7' discussed below) may include from about 10-70% Zr, more preferably from about 30-65% Zr, even more preferably from about 40-60% Zr, and most preferably from about 45-55% Zr in terms of atomic %; and from about 20-60% N, more preferably from about 30-50% N in terms of atomic %.

In certain example embodiments of this invention, zirconium nitride inclusive layer 7 (and 7' to be discussed below) may have a density of at least 6 gm/cm$^3$, more preferably at least 7 gm/cm$^3$. Additionally, in certain example embodiments, zirconium nitride layer 7 (and 7') may have an average hardness of at least 650 kgf/mm, more preferably of at least 700 kgf/mm, and/or may have a bond overlap population of at least 0.25 (more preferably at least about 0.30) for strength purposes. In certain example instances, many of the Zr—N bonds in layer 7 (and 7') may be of the covalent type, which are stronger than ionic bonds, for strength purposes. It is also noted that in certain example embodiments of this invention, the ZrN of layer 7 (and 7') may have a melting point of at least 2,500 degrees C., and it may be about 2,980 degrees C. in certain example instances. In certain example embodiments of this invention, the zirconium nitride of layer 7 (and 7') may be represented by $Zr_xN_y$, where the ratio x:y is from 0.8 to 1.2, and is preferably about 1.0 in certain example embodiments.

For purposes of example only, certain example thicknesses for the pre-HT layers shown on the left side of FIG. 1 are set forth below, with the layers being listed in order from the glass substrate outwardly.

Example Coating (FIG. 1)—Layer Thicknesses (Pre-HT)

| Layer | General | More Preferred | Most Preferred |
|---|---|---|---|
| Dielectric (layer 3) | 50-500 Å | 100-300 Å | 180-220 Å |
| DLC (layer 5) | 10-300 Å | 15-100 Å | 20-45 Å |
| ZrN (layer 7) | 40-500 Å | 50-400 Å | 90-220 Å |
| DLC (layer 9) | 20-300 Å | 30-100 Å | 40-65 Å |

Once the pre-HT coated article shown on the left side of FIG. 1 is formed, it may or may not be subjected to heat treatment sufficient for at least one of heat bending, thermal bending, and/or heat strengthening.

Referring to FIG. 1, when subjected to HT (e.g., in a furnace using temperature(s) of from 550 to 800 degrees C., more preferably from 580 to 800 degrees C.), the upper or outer DLC inclusive layer 9 burns off due to combustion because of the high temperatures used during HT. In particular, at least hydrogenated DLC layer 9 acts as a fuel which upon combustion with oxygen from the atmosphere during HT produces carbon dioxide and water. This exothermic reaction, caused by combustion of hydrogenated carbon from at least DLC layer 9, causes spontaneous propagation of a combustion wave through the initial reactants. The high temperature developed during this combustion heats the layer 7 comprising zirconium nitride to a temperature(s) well above the heat treating temperature used by the furnace. For example, the combustion of the DLC 9 may heat part of all of the layer 7 comprising zirconium nitride to a temperature of at least about 1200 degrees C., more preferably at least about 1500 degrees C., and most preferably at least about 2,000 degrees C.

Because the layer comprising zirconium nitride 7 is heated to such a high temperature due to the DLC combustion during HT, the layer comprising zirconium nitride 7 is transformed during the HT into a new post-HT layer comprising zirconium oxide 11. The new post-HT layer comprising zirconium oxide 11 may also include nitrogen (and/or other dopants) in certain example embodiments of this invention (e.g., ZrO:N; $ZrO_2$:N; or any other suitable stoichiometry). The new post-HT layer comprising zirconium oxide 11 (optionally with nitrogen) is surprisingly scratch resistant thereby providing a heat treated scratch resistant coated article. It is noted that the phrase "zirconium oxide" as used herein includes $ZrO_2$ and/or any other stoichiometry where Zr is at least partially oxidized. Herein, any description of layer 11 also may apply to layer 11'; and likewise any description of layer 7 may apply to layer 7'.

The post-HT layer comprising zirconium oxide 11 may include from 0-30% nitrogen in certain example embodiments of this invention, more preferably from 0-20% nitrogen, even more preferably from 0-10% nitrogen, and most preferably from about 1-5% nitrogen in certain example embodiments of this invention. The post-HT layer comprising zirconium oxide 11 may include from about 10-70% Zr, more preferably from about 20-60% Zr, even more preferably from about 30-55% Zr, and most preferably from about 30-45% Zr in terms of atomic %. Moreover, the post-HT layer(s) comprising zirconium oxide 11 in certain example embodiments of this invention may include from about 10-85% oxygen, more preferably from about 30-80% oxygen, even more preferably from about 40-70% oxygen, and most preferably from about 50 to 70% oxygen.

In certain example embodiments of this invention, the post-HT layer comprising zirconium oxide 11 includes a nanocrystalline cubic lattice structure (although the pre-HT layer comprising zirconium nitride did not in certain instances). As explained above, zirconium nitride typically does not grow in cubic phase unless at a temperature of at least about 2,000 degrees C. It has surprisingly been found that the combustion generated by the DLC during HT causes at least part of the pre-HT layer comprising zirconium nitride 7 to be heated sufficiently to cause it to grow in the cubic phase and become a post-HT layer 11 comprising a nanocrystalline cubic lattice structure including zirconium oxide (with or without nitrogen) which is very scratch resistant in certain example embodiments of this invention.

It has surprisingly been found that the use of zirconium nitride (e.g., ZrN) in the pre-HT layer 7 is especially beneficial with respect to allowing a post-HT phase-transformed layer 11 including Zr to be formed which is very scratch resistant.

The final HT (or even the non-HT) coated article of FIG. 1 is scratch resistant and may be used in various applications, including but not limited to IG window units, laminated vehicle windshields, other types of vehicle windows, furniture applications, and/or the like.

For purposes of example only, certain example thicknesses for the post-HT coated article shown on the right side of FIG. 1 are set forth below, with the layers being listed in order from the glass substrate outwardly.

Example Coating (FIG. 1)—Layer Thicknesses (Post-HT)

| Layer | General | More Preferred | Most Preferred |
|---|---|---|---|
| Dielectric (layer 3) | 50-500 Å | 100-300 Å | 180-220 Å |
| DLC (layer 5) | 0-300 Å | 15-100 Å | 20-45 Å |
| ZrO:N (layer 11) | 50-800 Å | 70-600 Å | 100-350 Å |

It can be seen from the above that post-HT Zr inclusive layer 11 is typically thicker than is pre-HT Zr inclusive layer 7. In other words, the thickness of the Zr inclusive layer increases during Hf. In certain example embodiments of this invention, the thickness of the Zr inclusive layer (e.g., from layer 7 to layer 11) may increase at least about 5% during or due to HT, more preferably at least about 10%, and most preferably at least about 40%. This increase in thickness is caused by the transformation of layer 7 into layer 11, where oxygen migrates into the post-HT layer 11 (i.e., more oxygen migrates into the post-HT layer 11 than nitrogen leaves in terms of atomic % and/or size).

While the DLC layer 5 is shown as being present in the post-HT coated article in FIG. 1, it need not be present in the post-HT coated article in alternative embodiments of this invention. If the pre-HT DLC layer 5 reaches sufficient temperature and/or is exposed to enough oxygen during HT, it may be subject to combustion thereby causing it to decrease in thickness or even vanish due to HT in certain instances. In such cases, the pre-HT layers 5, 7 and/or 9 may be effectively transformed during HT into post-ITF zirconium oxide inclusive layer 11 (it is similar to the FIG. 5 embodiment in this regard).

In certain example embodiments of this invention, the heat treated layer 11 comprising zirconium oxide includes $Zr_xO_y$, wherein y/x is from about 1.2 to 2.5, more preferably from about 1.4 to 2.1.

Figure 2:
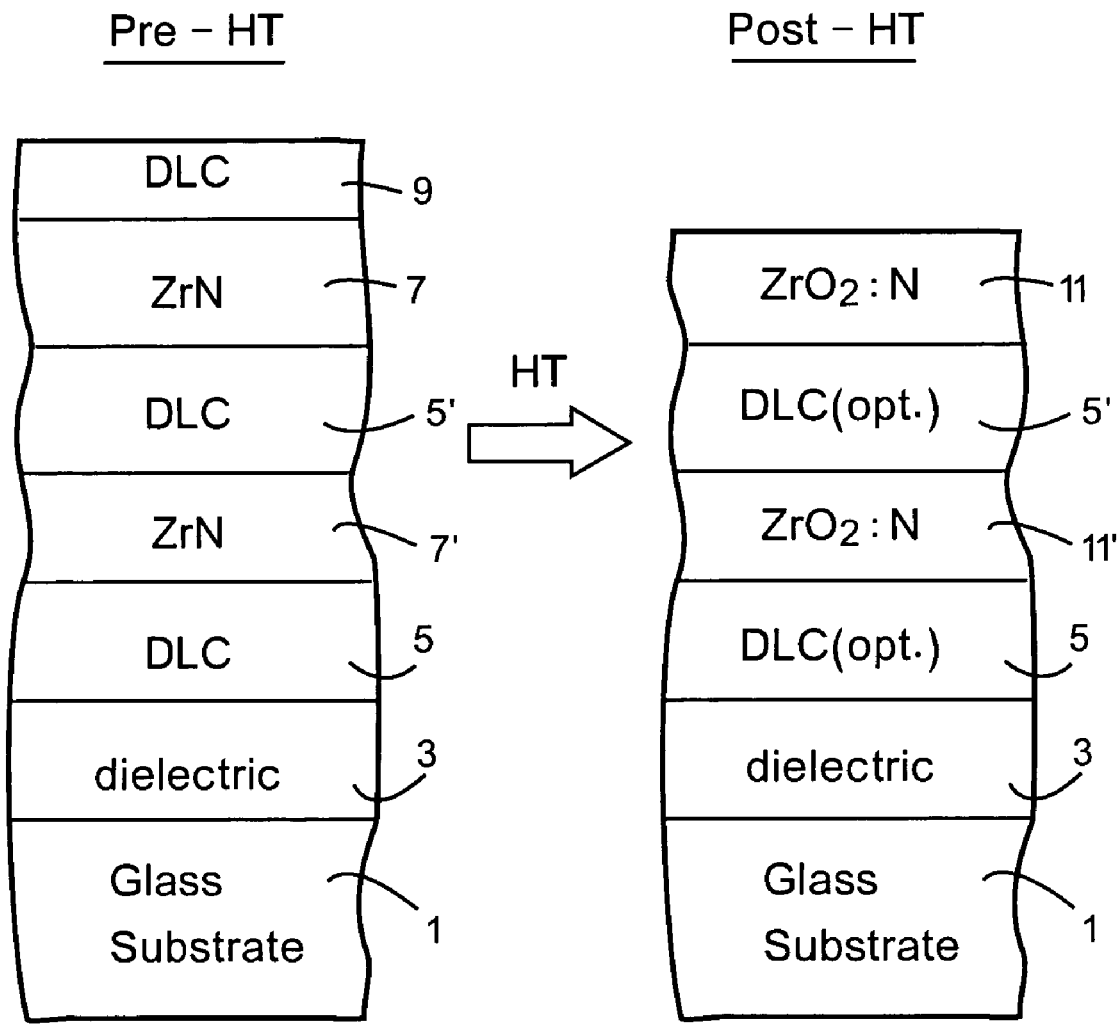
FIG. 2 is a schematic diagram illustrating coated articles according to another embodiment of this invention before and after heat treatment.

FIG. 2 illustrates another example embodiment according to this invention. The FIG. 2 embodiment is similar to the FIG. 1 embodiment, except that additional ZrN inclusive layer(s) 7' and additional DLC inclusive layer(s) 5' are provided pre-ITf. In other words, the FIG. 2 embodiment includes plural sets of alternating layers comprising DLC and ZrN pre-HT. Thus, following HT, an additional zirconium oxide inclusive layer(s) 11' and an additional DLC inclusive layer 5' may be provided as shown on the right side of FIG. 2. Layers 5', 7', and 11' are similar to layers 5, 7, and 11, respectively, discussed above, in certain example embodiments of this invention. However, it is possible that one or both of hydrogenated DLC layers 5, 5' may be subject to combustion and substantially disappear or substantially decrease in thickness due to HT in certain example embodiments of this invention when high temperature and/or long heating times are used so that a single ZrO layer remains (e.g., see FIG. 5), although some DLC may remain as shown in FIG. 2. However, as shown in the FIG. 2 embodiment, at least the outer hydrogenated DLC layer 9 typically burns off due to combustion and generates the energy/heat needed to cause one or more of the ZrN layer(s) 7, 7' to transform into ZrO inclusive layer(s) 11, 11' as explained above.

Still referring to the FIG. 2 embodiment, in certain example non-limiting embodiments of this invention, oxygen from the atmosphere diffuses inwardly through the layers(s) in order to help the pre-HT zirconium nitride layers 7 and 7' to transform, aided by the heat generated by the combustion discussed above, into the post-HT layers 11 and 11' comprising zirconium oxide. However, in other example embodiments of this invention, pre-HT zirconium nitride layer 7' need not phase transform during HT; in such embodiments, the post-HT layer 11' would be similar to the pre-HT layer 7' and consist essentially of zirconium nitride. In still other embodiments of this invention, layer 11' may be partially transformed and thus include a mixture of zirconium nitride and zirconium oxide.

Figure 3:
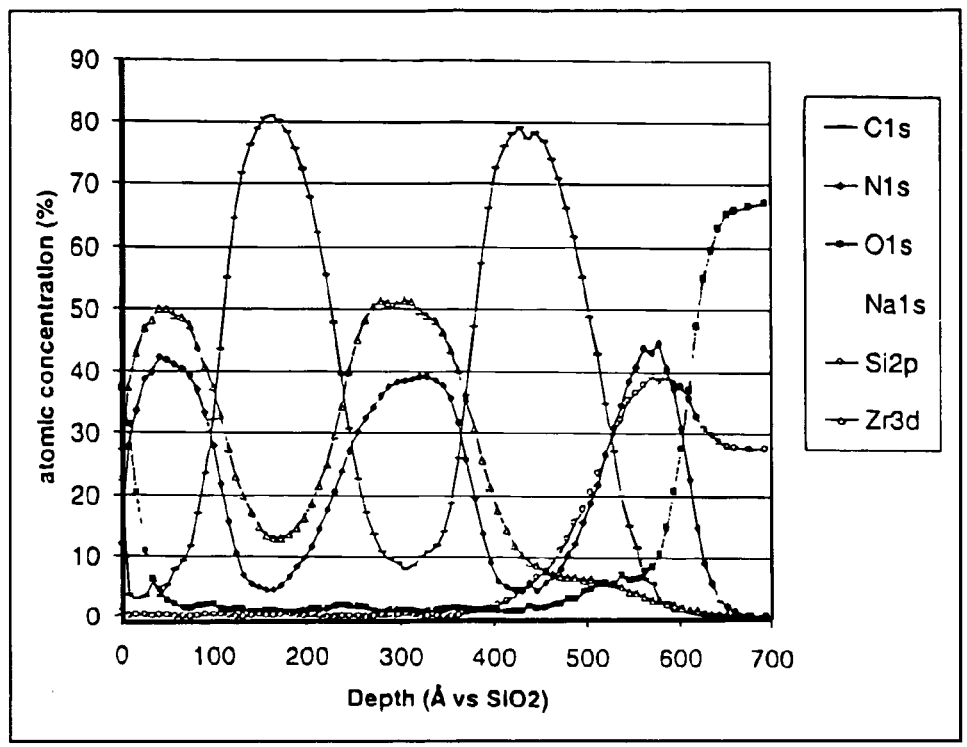
FIG. 3 is an XPS graph illustrating chemical elements in a pre-HT coated article according to an example of the instant invention.
Figure 4:
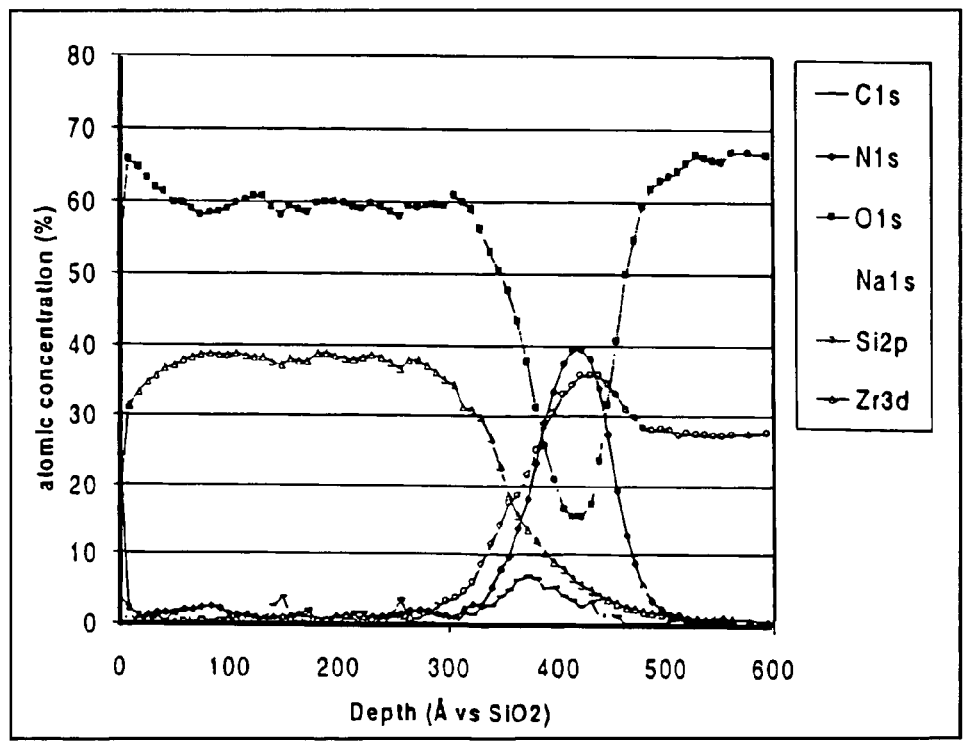
FIG. 4 is an XPS graph illustrating chemical elements in the coated article of FIG. 3, after the coated article of FIG. 3 has been subjected to HT.
Figure 5:
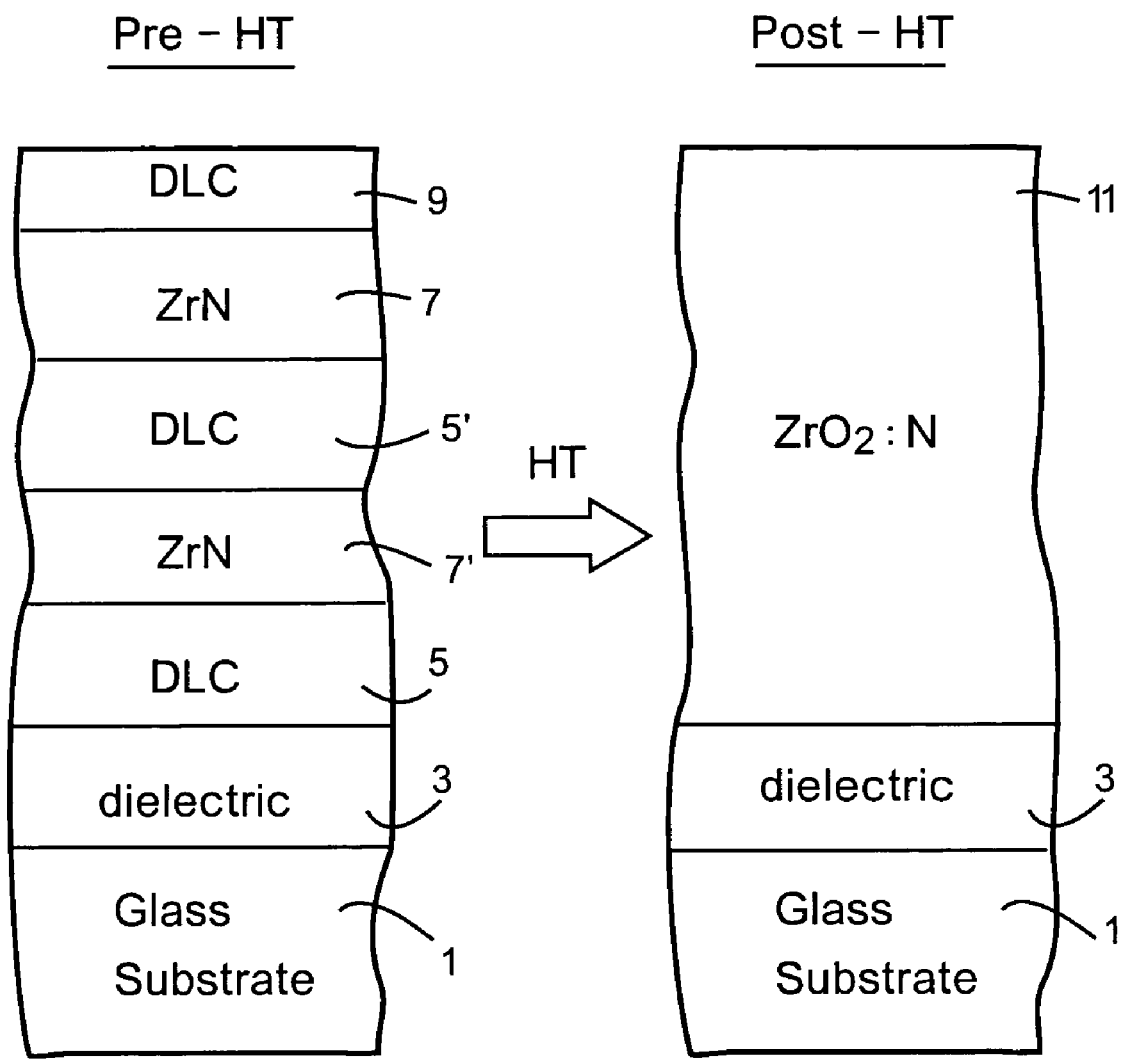
FIG. 5 is a schematic diagram illustrating coated articles according to an embodiment of this invention before and after heat treatment.

FIGS. 3-5 illustrate another example embodiment of this invention. The pre-HT coated article of this embodiment is the same as that of the FIG. 2 embodiment described above. FIG. 3 is an XPS graph illustrating the chemical make-up of an example coated article pre-HT according to the FIG. 5 embodiment. However, in contrast to the FIG. 2 illustrated embodiment, in the FIG. 5 embodiment during HT all DLC layers are subject to combustion and essentially disappear. This in turn creates a significant amount of heat and coupled with oxygen diffusing into the coating from the surrounding atmosphere causes each of the pre-HT zirconium nitride layers to phase transform during HT so as to form at least one post-HT layer comprising zirconium oxide (which may or may not be doped with N) 11. In the FIG. 5 embodiment, the pre-HT layers 5, 7', 5', 7 and 9 merge into or ultimately result in one rather thick post-HT layer comprising zirconium oxide 11. FIG. 4 is an XPS graph illustrating the chemical make-up of an example post-HT coated article according to the FIG. 5 embodiment.

In the FIGS. 3-5 embodiment, it can be seen in FIG. 4 that residual carbon remains in the zirconium oxide layer 11 following HT due to the presence of the pre-HT DLC layer(s). In certain example embodiments of this invention, the zirconium oxide layer 11 includes from 0.25 to 20% C, more preferably from 0.25 to 10% C, and most preferably from 0.25 to 5% C.

Figure 6:
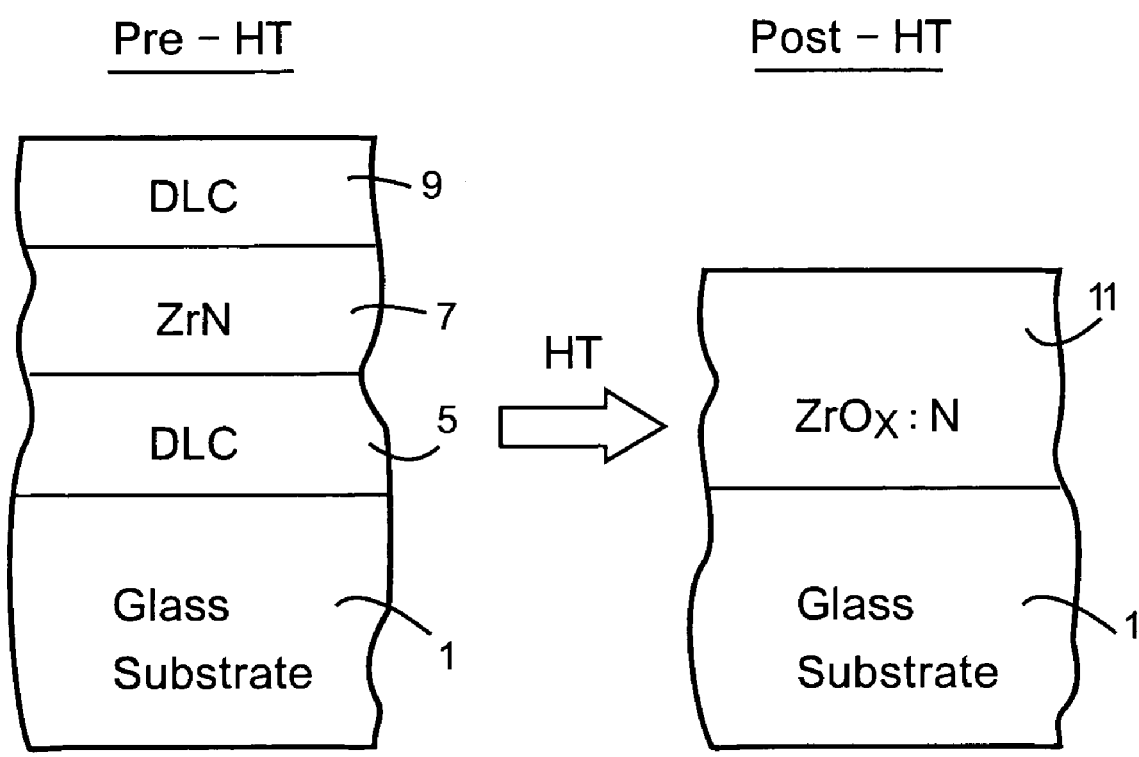
FIG. 6 is a schematic diagram illustrating coated articles according to another embodiment of this invention before and after heat treatment.

FIG. 6 is a cross sectional view of another example embodiment of this invention. In the FIG. 6 embodiment, the optional layer 5 comprising DLC is located directly on the glass substrate 1. Certain carbon atoms may be subimplanted into the substrate in certain example instances to improve bonding. Zirconium nitride inclusive layer 7 is located between and contacting DLC layers 5 and 9 in this example embodiment. As with the other embodiments discussed herein, the zirconium nitride may be doped with F and/or C in certain example embodiments of this invention. During heat treatment, at least outer DLC inclusive layer 9 acts as a fuel to cause at least layer 7 to transform into a new post-HT layer 11 comprising or consisting essentially of zirconium oxide as shown in FIG. 6 and described above. DLC layer 5, during HT, may act as a fuel and/or may melt into the glass and/or layer 7, 11 during HT as a result of combustion.

When layer 5 melts into the glass 1 during HT, the result is a transitional interface layer proximate the substrate surface that comprises silicon oxycarbide. In certain embodiments of this invention, DLC layer 5 may function as a Na barrier to prevent significant amounts of Na from migrating from the glass to the zirconium inclusive layer during HT, so as to reduce the likelihood of damage to the Zr inclusive layer.

In certain other instances, it is possible that the DLC layer 5 may shrink but not entirely disappear during ITF in certain example embodiments of this invention.

In the FIG. 6 embodiment, DLC layer 5 may be from about 20 to 60 Å thick, more preferably from 28 to 34 Å thick, or may be any other suitable thickness; ZrN inclusive layer 7 may be from about 100 to 200 Å thick, more preferably from about 150 to 190 Å thick, most preferably from about 160 to 170 Å thick, or may be any other suitable thickness; and DLC layer 9 may be from 50 to 200 Å thick, more preferably from 80 to 120 Å thick, most preferably from 90 to 110 Å thick, or any other suitable thickness in certain example instances. In certain instances, if the thickness of the bottom DLC layer 5 falls outside of the range 28 to 34 Å, undesirable haze can increase rapidly, especially on the low side.

Figure 7:
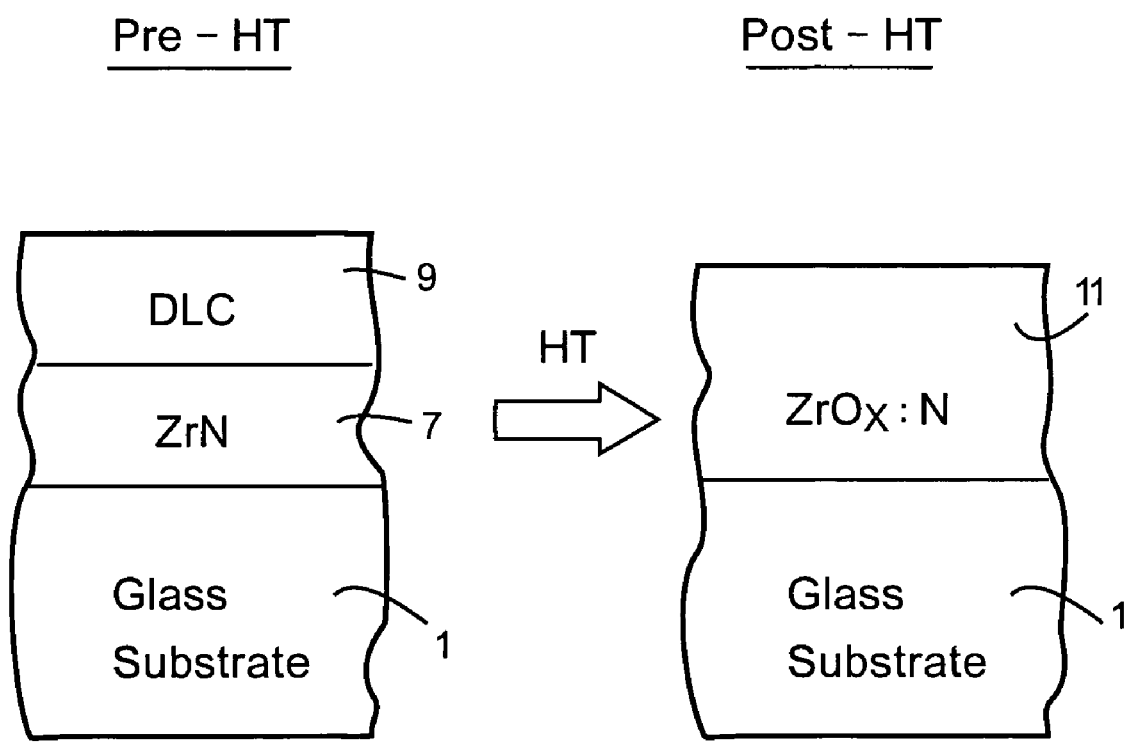
FIG. 7 is a schematic diagram illustrating coated articles according to yet another embodiment of this invention before and after heat treatment.

FIG. 7 is a cross sectional view of another example embodiment of this invention. The FIG. 7 embodiment is similar to the FIG. 6 embodiment, except for the omission of bottom DLC layer 5. Thus, in the FIG. 7 embodiment, the layer 7 comprising zirconium nitride is located directly on the glass substrate 1 before HT. As with the other embodiments discussed herein, the zirconium nitride 7 may be doped with F and/or C in certain example embodiments of this invention, and thus the heat treated zirconium oxide 11 may be doped with F and/or C in a similar manner. In the FIG. 7 embodiment, for example, layer 7 may be from about 50-400 Å thick, more preferably from about 80-200 Å thick, and most preferably from about 120-180 Å thick; and DLC layer 9 may be from about 30 to 400 Å thick, more preferably from about 50 to 150 Å thick, and most preferably from about 80 to 120 Å thick.

As an alternative of the FIG. 7 embodiment, an underlayer (not shown in FIG. 7) may be provided between the zirconium nitride layer 7 and the substrate 1. This underlayer may be of, or include, a material such as silicon oxide (e.g., $SiO_2$) or silicon nitride. This underlayer is similar to dielectric layer 3 shown in FIGS. 1, 2 and 5 for example.

Figure 8:
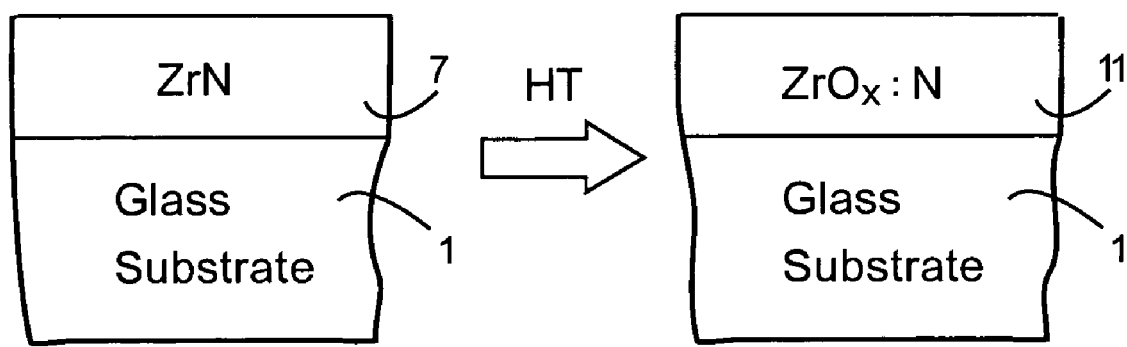
FIG. 8 is a schematic diagram illustrating coated articles according to yet another embodiment of this invention before and after heat treatment.

FIG. 8 is a cross sectional view of another example embodiment of this invention. The FIG. 8 embodiment is similar to the FIG. 6 and FIG. 7 embodiments, except for the omission of the DLC layers 5, 9. Thus, in the FIG. 8 embodiment, the layer 7 comprising zirconium nitride may be located directly on the glass substrate 1 before HT. As with the other embodiments discussed herein, the zirconium nitride 7 may be doped with F and/or C in certain example embodiments of this invention, and thus the heat treated zirconium oxide 11 may be doped with F and/or C in a similar manner. In the FIG. 8 embodiment, it has been found that it has been surprisingly helpful to make the zirconium nitride inclusive layer 7 somewhat thicker. In particular, in the FIG. 8 embodiment for example layer 7 may be from about 150-400 Å thick, more preferably from about 200-320 Å thick. If the layer 7 is thicker than this, then visible transmission may suffer, whereas if the thickness is lower than this then stain resistance (i.e., resistance to corrosion of the coated article) may suffer following HT. Zirconium nitride inclusive layer 7 may be deposited on substrate 1 by sputtering a Zr or Zr inclusive target in certain example embodiments of this invention.

The FIG. 8 embodiment has been found to be advantageous in that a wider process window for tempering may be possible since samples that have been over-cooked during HT have not shown streaks or haze in contrast with DLC inclusive embodiments discussed herein. Thus, the FIG. 8 embodiment may ease tolerance requirements in the manufacturing process. Moreover, in the FIG. 8 embodiment, it has been found that surface treatment (e.g., mechanical buffing) improves the scratch resistance of post-HT zirconium oxide based layer 11.

As an alternative of the FIG. 8 embodiment, an underlayer (not shown in FIG. 8) may be provided between the zirconium nitride layer 7 and the substrate 1. This underlayer may be of, or include, a material such as silicon oxide (e.g., $SiO_2$) or silicon nitride. This underlayer is similar to dielectric layer 3 shown in FIGS. 1, 2 and 5 for example.

In any of the example embodiments discussed above, one or more of the layers comprising zirconium nitride (7 and/or 7') may be doped with fluorine (F) and/or carbon (C). This may be done, for example, by using a gas such as $C_2F_6$ during sputter-deposition of the layer(s) comprising zirconium nitride. For instance, a layer of ZrN:F (7 and/or 7') may be formed by sputtering a Zr inclusive target(s) in an atmosphere including a mixture of $N_2$ and $C_2F_6$ gases (Ar gas may also be used in certain example instances in addition to $N_2$ and $C_2F_6$ gases). When $C_2F_6$ gas is used in the sputtering atmosphere, the resulting layer comprising ZrN is typically doped with both F and C since both are present in the gas. Other gases could instead be used.

Surprisingly, it has been found that doping the zirconium nitride (7 and/or 7') with F and/or C prior to heat treatment tends to increase the visible transmission of the heat treated coated article. Doping with F and C unexpectedly results in a film with lower absorption compared to undoped films. Moreover, it has been found that the addition of F and/or C to these layers does not significantly change the optics of the coated article, or the biaxial film stress of the films prior to HT. Furthermore, when F and/or C are provided in layer 7 and/or 7', both scratch resistance and environmental stability (e.g., measured via salt fog test) of the HT product are substantially unaffected by the presence of F and/or C. Of course, following heat treatment the layer comprising zirconium oxide (11 and/or 11') may also be doped with F and/or C in a corresponding manner since it was present before HT. This doping of zirconium nitride (and/or zirconium oxide) with F and/or C may be used in conjunction with any embodiment discussed herein.

In certain example embodiments of this invention, one or more of layers 7, 7', 11 and 11' may be doped with from about 0.01 to 10.0% F, more preferably from about 0.1 to 8.0% F, even more preferably from about 0.3 to 5.0% F, still more preferably from about 0.4 to 2% F, and most preferably from about 0.5 to 1.0% F (in terms of atomic percent). Moreover, in certain example embodiments of this invention, one or more of layers 7, 7', 11 and 11' may be doped with from about 0.01 to 10.0% C, more preferably from about 0.1 to 8.0% C, even more preferably from about 0.3 to 5.0% C, still more preferably from about 0.4 to 2% C, and most preferably from about 0.5 to 1.0% C (in terms of atomic percent). The doping with F and C may be used together so that one or more of layers 7, 7', 11 and 11' is/are doped with both F and C in these amounts. Alternatively, only one of the dopants F and C may be used for a layer. Thus, in such alternative embodiments, one or more of layers 7, 7', 11 and 11' may be doped with F in the aforesaid amount(s), but not doped with C. As yet another alternative, one or more of layers 7, 7', 11 and 11' may be doped with C in the aforesaid amount(s), but not doped with F.

Each of the aforesaid embodiments provides for a heat treatable coated article that is very scratch resistant following HT. For example, post-HT coated articles according to certain embodiments of this invention may have a critical scratch load using an alumina sphere of at least about 15 lbs., more preferably at least 18 lbs., even more preferably at least 20 lbs., still most preferably at least 22.5 lbs., and most preferably at least 30 lbs. Additionally, coated articles according to certain example embodiments of this invention are UV stable, and do not significantly degrade upon UV exposure. In certain example embodiments, coated articles herein may have a post-HT contact angle θ with a sessile drop of water of from about 25 to 60 degrees; and sometimes the contact angle is less than 35 degrees.

Moreover, in certain example embodiments, good optics are provided in that no significant yellow tint is present post-HT even though yellowish DLC may have been present at least in the pre-HT version of the product. The resulting heat treated coated article is surprisingly transmissive to visible light. For example, the heat treated coated article may have a visible transmission of at least 50%, more preferably of at least 60%, even more preferably of at least 70%, more preferably at least 75%, and sometimes at least 80% according to certain example embodiments of this invention. According to certain example embodiments of this invention, post-HT coated articles have a transmissive a* value of from −5 to +2, more preferably from −4 to 0, and most preferably from −3.5 to −1; and a transmissive b* value of from −8 to +8, more preferably from −3 to +1, and most preferably from −2 to +2. In other words, heat treated coated articles according to certain example embodiments of this invention visually appear very similar to clear uncoated glass, even though the numerous layers for durability purposes are provided thereon.

Another unique aspect of certain example embodiments of this invention is the extreme increase in visible transmission caused by heat treatment. In certain example embodiments, visible transmission increases by at least about 20 visible transmission % due to HT, more preferably at least 30%, and most preferably at least 40%. For example, in certain examples of this invention that have been made, the pre-HT visible transmission has been about 36-37%. Following heat treatment for about 400 seconds at about 640 degrees C., the post-HT visible transmission was about 77-81%. In each case, the visible transmission increased by about 40-45% due to HT. For purposes of example and understanding, if a pre-HT coated article had a visible transmission of 36% and following HT the post-HT coated article had a visible transmission of 80%, then the visible transmission increased 44% (i.e., 80%-36%=44%) due to HT. The apparent reason for this significant increase in visible transmission due to HT is the vanishing of at least some DLC due to HT because of the aforesaid combustion thereof. DLC blocks visible transmission to some extent, and its combustion and disappearance during HT allows visible transmission of the resulting HT coated article to significantly increase as shown above. Thus, not only does the DLC combustion act as a fuel which allows transformation of the Zr inclusive layer, but it also allows visible transmission to significantly increase.

Any suitable type of glass substrate 1 may be used in different embodiments of this invention. For example, various types of soda lime silica glass or borosilicate glass may be used for substrate 1. However, in certain example embodiments of this invention, the coating of any of the aforesaid embodiments may be supported by a special type of glass substrate that has a very high visible transmission and a very clear color. In particular, in such certain example embodiments of this invention, the glass substrate 1 may be any of the glasses described in commonly owned U.S. patent application Ser. No. 10/667,975, the disclosure of which is hereby incorporated herein by reference. In certain preferred embodiments, the resulting glass has visible transmission of at least 85%, more preferably at least 88%, and most preferably at least 90% (e.g., at a reference thickness of about 0.219 inches or 5.56 mm). The advantage of using such a glass substrate 1 is that the resulting HT product is caused to have a visual appearance similar to that of uncoated clear glass—even though the coating is provided thereon. In addition to the base glass, examples of the glass batch and/or final glass are set forth below (in terms of weight percentage of the total glass composition, unless otherwise listed as ppm):

Example Colorants and Oxidizer Cerium in Glass Substrate

| Ingredient | General | Preferred | More Preferred | Best |
|---|---|---|---|---|
| total iron (Fe₂O₃): | 0.01-0.20% | 0.01-0.15% | 0.02-0.12% | 0.03 to 0.10% |
| cobalt oxide: | 0 to 15 ppm | 0.1 to 10 ppm | 0.5 to 5 ppm | 0.5 to 3 ppm |
| cerium oxide: | 0.005-1.0% | 0.01-1.0% | 0.01-0.5% | 0.05 to 0.2% |
| erbium oxide: | 0 to 1.0% | 0.01-0.30% | 0.02-0.20% | 0.02 to 0.15% |
| titanium oxide: | 0 to 0.5% | 0 to 0.2% | 0.001 to 0.05% | 0.01 to 0.02% |
| chromium oxide: | 0 to 10 ppm | 0 to 8 ppm | 0 to 5 ppm | 1 to 5 ppm |
| glass redox: | <=0.20 | <=0.12 | <=0.10 | <=0.08 |
| % FeO: | 0.0001-0.05% | 0.0001-0.01% | 0.001-0.008% | 0.001-0.003% |

It is noted that in other embodiments of this invention, additional layers (not shown) may be added to the coated articles discussed above, and/or certain layer(s) may be deleted.

EXAMPLE 1

For purposes of example, and without limitation, the following example coated article was made and tested according to an example embodiment of this invention. This Example 1 is similar to the FIG. 5 embodiment.

The glass substrate 1 was cleaned/washed. It was then ion beam etched using argon gas to clean the surface thereof. Then, a silicon nitride barrier layer 3 (doped with Al) about 100 Å thick, a DLC (ta-C:H type) layer 5 about 70 Å thick, a zirconium nitride layer 7' about 100 Å thick, another DLC (ta-C:H type) layer 5' about 70 Å thick, another zirconium nitride layer 7 about 100 Å thick, and a sacrificial outer DLC (ta-C:H type) layer 9 about 70 Å thick were formed on a glass substrate (see FIG. 5). The ZrN layers 7 and 7' were formed via sputtering a Zr target in an atmosphere including N and Ar, and the DLC layers were formed via ion-beam deposition using an anode-cathode voltage of about 3,000 V and acetylene feedstock gas.

FIG. 3 is an XPS graph illustrating the pre-HT chemical make-up of the coated article according to this Example. As can be seen in FIG. 3, the carbon (C) spikes indicate the DLC layers 5 and 5', whereas the Zr spikes indicate the ZrN layers 7 and 7'. It is noted that the C content increases on the left edge of the FIG. 3 graph showing the thin DLC sacrificial layer 9 at the outermost layer of the pre-HT coating. The high oxygen content on the right side of the graph indicates the glass substrate, and the combination of the Si and N spikes in the same area indicates the optional silicon nitride barrier layer 3.

The coated article of Example 1 was then subjected to HT at about 625 degrees C. for about four minutes.

FIG. 4 is an XPS graph of the coated article of FIG. 3 (i.e., of this Example 1) after the HT. FIG. 4 illustrates that the overcoat DLC layer 9 burned off during HT due to combustion, and that pre-HT layers 5, 7', 5' and 7 merged or were transformed into a thick layer consisting essentially of scratch resistant zirconium oxide 11 that was slightly doped with nitrogen (see the right-hand coated article in FIG. 5 which is the post-HT article). It can be seen in FIG. 4 that residual carbon is left over in the zirconium oxide layer 11 due to the previous DLC layers which were present prior to heat treatment.

EXAMPLE 2

Example 2 was made in accordance with the FIG. 6 embodiment. On a 10 mm thick clear glass substrate having a composition similar to that discussed above, layers 5, 7 and 9 were formed as shown in FIG. 6. DLC layer 5 was 34 Å thick, ZrN layer 7 was 160 Å thick, and DLC layer 9 was 100 Å thick. The two DLC layers were formed via ion beam deposition using acetylene gas, while the zirconium nitride layer 7 was formed via sputtering using a power of about 3 kW. Following heat treatment, the coated article included substrate 1 and zirconium oxide layer 11 that included some nitrogen as shown on the right side of FIG. 6.

Following HT, based on three different samples of this example, the coated article of this example on average had a visible transmission of about 78.61%, a critical scratch load (CSL) of 31 lbs. and a haze value of 1.6.

EXAMPLE 3

Example 3 was made in accordance with the FIG. 7 embodiment. On a 10 mm thick clear glass substrate 1 having a composition similar to that discussed above, layers 7 and 9 were formed as shown in FIG. 7. ZrN layer 7 was 160 Å thick, and DLC layer 9 was from 60-100 Å thick. As with other examples, the zirconium nitride layer was formed by sputtering. Following heat treatment, the coated article included substrate 1 and zirconium oxide layer 11 that included some nitrogen as shown on the right side of FIG. 7.

Following HT, based on three different samples of this example, the coated article of this example on average had a visible transmission of about 81.35%, a critical scratch load (CSL) of 10.8 lbs. and a haze value of 0.44.

In certain example non-limiting embodiments of this invention, coated articles following HT may have a visible transmission of at least 70%, more preferably of at least 75%. In certain example non-limiting embodiments of this invention, coated articles following HT may have a haze value of no greater than 2.5, more preferably no greater than 1.75, and sometimes no greater than 1.0.

EXAMPLE 4

In Example 4, a coated article was made in accordance with the FIG. 8 embodiment. A ZrN layer 7 was sputter deposited directly on a glass substrate using a Zr target in an atmosphere including Ar and N gases, to a thickness of about 326 angstroms. The Ar gas flow per cathode was 190 sccm, the $N_2$ gas flow per cathode was 79.2 sccm, the operating pressure in the sputtering chamber was 2.4 mTorr, and the $N_2$/power ratio was about 6.1. The glass substrate was clear glass about 6 mm thick. As coated, prior to heat treatment, the coated article had a visible transmission of about 38%. The coated article was then heat treated in a box oven furnace for about 4-5 minutes, and following heat treatment mechanical buffing using greater than 10 lbs of pressure was performed on the outer surface of the zirconium oxide based layer 11. The heat treatment caused the zirconium nitride based layer 7 to transform into a zirconium oxide based layer 11. Following the heat treatment, the coated article had a visible transmission of about 79%. There were no signs of streaks of haze following the heat treatment, and scratch resistance was good.

With respect to any embodiment herein, the glass substrate may be ion beam milled prior to deposition of a coating thereon. For example, a step of ion beam milling the glass substrate 1 (e.g., the non-tin surface thereof) may be performed so as to remove at least 2 Å (more preferably at least 5 Å, and most preferably at least 10 Å) of glass from at least a portion (and possibly the entire) glass substrate surface. Then, after the ion beam milling of the glass substrate 1, the base layers 3, 5 and/or 7 and then the other layers are deposited on the ion beam milled surface of the glass substrate 1. For example, glass substrate 1 may be ion beam milled using any technique for ion beam milling described in U.S. Pat. Nos. 6,777,030 and/or 6,740,211, the disclosures of which are hereby incorporated herein by reference.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of making a heat treated coated article, the method comprising:
    having a coating supported by a glass substrate, the coating comprising a zirconium nitride based layer; and
    thermally tempering the glass substrate with the zirconium nitride based layer thereon, so that the tempering causes the zirconium nitride based layer to transform into a layer comprising zirconium oxide ($Zr_xO_y$) where y/x is from about 1.2 to 2.5, and wherein the layer comprising zirconium oxide further comprises fluorine and/or carbon.

2. The method of claim 1, wherein y/x is from about 1.4 to 2.1.

3. A method of making a heat treated coated article, the method comprising:
    having a coating supported by a glass substrate, the coating comprising a zirconium nitride based layer; and
    thermally tempering the glass substrate with the zirconium nitride based layer thereon, so that the tempering causes the zirconium nitride based layer to transform into a layer comprising zirconium oxide ($Zr_xO_y$) where y/x is from about 1.2 to 2.5, wherein the zirconium nitride based layer further comprises fluorine and/or carbon.

4. The method of claim 3, wherein the layer comprising zirconium oxide further comprises fluorine and/or carbon.

5. The method of claim 1, wherein prior to the tempering, the coating further comprises a layer comprising diamond-like carbon located between the glass substrate and the zirconium nitride based layer.

6. The method of claim 1, wherein prior to the tempering, the coating further comprises a layer comprising diamond-like carbon located on the glass substrate over at least the zirconium nitride based layer.

7. The method of claim 1, wherein prior to and/or after the tempering, the coating further comprises a dielectric layer between the glass substrate and the zirconium nitride based layer.

8. The method of claim 1, wherein the layer comprising zirconium oxide comprises a nanocrystalline cubic lattice structure.

9. The method of claim 1, wherein the layer comprising zirconium oxide comprises from about 30-80% oxygen.

10. The method of claim 1, wherein the layer comprising zirconium oxide comprises from about 50 to 70% oxygen.

11. The method of claim 1, wherein the layer comprising zirconium oxide comprises from about 20-60% Zr.

12. The method of claim 1, wherein the layer comprising zirconium oxide comprises from about 30-55% Zr.

13. The method of claim 1, wherein the layer comprising zirconium oxide comprises from about 30-45% Zr and from about 0-10% N.

14. The method of claim 1, wherein the layer comprising zirconium oxide is an outermost layer of the coated article following heat treatment.

15. The method of claim 1, wherein visible transmission % of the coated article increases by at least 30% due to the tempering.

16. The method of claim 1, wherein the tempered coated article has a transmissive a* value of from −4 to 0, and a transmissive b* value of from −3 to +3.

17. The method of claim 1, wherein the tempered coated article has a visible transmission of at least 70%.

18. The method of claim 1, wherein the coated article after tempering has a visible transmission of at least 70% and a critical scratch load using an alumina sphere of at least about 20 lbs.

19. A method of making a heat treated coated article, the method comprising:
having a coating supported by a glass substrate, the coating comprising a layer comprising zirconium nitride; and
thermally tempering the glass substrate with the layer comprising zirconium nitride, so that the tempering causes zirconium nitride to transform into a layer comprising zirconium oxide ($Zr_xO_y$) where y/x is from about 1.2 to 2.5, and wherein the layer comprising zirconium oxide further comprises fluorine and/or carbon.

* * * * *